(12) United States Patent
Li et al.

(10) Patent No.: US 7,707,740 B2
(45) Date of Patent: May 4, 2010

(54) HEIGHT SCALE

(76) Inventors: Weilong Li, c/o NCI Technology, Inc., Suite 460, 1101 Perimeter Dr., Schaumburg, IL (US) 60173; Zhen Yu, c/o NCI Technology, Inc., Suite 460, 1101 Perimeter Dr., Schaumburg, IL (US) 60173; Ricardo Murguia, c/o NCI Technology, Inc., Suite 460, 1101 Perimeter Dr., Schaumburg, IL (US) 60173

( * ) Notice: Subject to any disclaimer, the term of this patent is extended or adjusted under 35 U.S.C. 154(b) by 43 days.

(21) Appl. No.: 12/230,615

(22) Filed: Sep. 2, 2008

(65) Prior Publication Data

US 2009/0071026 A1    Mar. 19, 2009

Related U.S. Application Data

(60) Provisional application No. 60/969,351, filed on Aug. 31, 2007.

(51) Int. Cl.
*G01B 5/02* (2006.01)
*A61B 5/103* (2006.01)

(52) U.S. Cl. .......................................... 33/832; 33/512
(58) Field of Classification Search .................. 33/484, 33/486, 487, 511, 512, 832, 833; 600/587
See application file for complete search history.

(56) References Cited

U.S. PATENT DOCUMENTS

| | | | | | |
|---|---|---|---|---|---|
| 2,215,884 | A | * | 9/1940 | Runge | 33/512 |
| 2,902,766 | A | * | 9/1959 | Lindstrom | 33/613 |
| 4,134,213 | A | * | 1/1979 | Kushmuk | 33/512 |
| 6,003,235 | A | * | 12/1999 | Chen | 33/512 |
| 6,919,517 | B2 | * | 7/2005 | Montagnino et al. | 33/484 |
| 7,171,760 | B1 | * | 2/2007 | Lemon | 33/833 |
| 7,263,786 | B1 | * | 9/2007 | Zanier | 33/832 |
| 2005/0155246 | A1 | * | 7/2005 | Montagnino | 33/832 |
| 2005/0183281 | A1 | * | 8/2005 | Kennedy | 33/833 |

* cited by examiner

*Primary Examiner*—G. Bradley Bennett
(74) *Attorney, Agent, or Firm*—Dykema Gossett PLLC

(57) ABSTRACT

A height scale includes a base, a column assembly mounted on the base and a height rod assembly movably mounted along and within the column assembly, the height rod assembly including a lever assembly with a lever, a lever bracket and a rod cap having self-locking release tabs on opposite sides thereof.

6 Claims, 3 Drawing Sheets

HEIGHT SCALE

CROSS-REFERENCE TO RELATED APPLICATION

This application is related to U.S. Provisional Application No. 60/969,351, filed Aug. 31, 2007, the priority of which is hereby claimed.

BACKGROUND OF THE INVENTION

The present invention relates to a height scale.

Height scales for the measuring of a user's height are known. The present invention provides a height scale that is easier to use than those currently available.

The inventive height scale will be best understood by reference to the accompanying drawings.

DETAILED DESCRIPTION OF THE PREFERRED EMBODIMENT

FIGS. 1-5 show a view of a height scale according to a preferred embodiment of the invention. It includes a column assembly 14 and a height rod assembly 13 mounted on base B.

The column assembly includes a lower scale column 11, and upper scale column 9, a connecting bracket 10, and an indicator support 12. The scale columns define a central channel 9A and longitudinal channels 9B on opposite sides thereof (see FIG. 5). The connecting bracket 10 and indicator support 12 can be made of metal or plastic.

Figure 4:
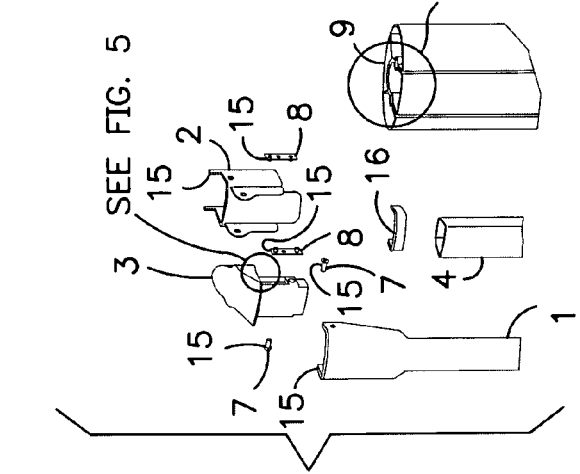
FIG. 4 shows an enlarged view of detail A in FIG. 3.
Figure 3:
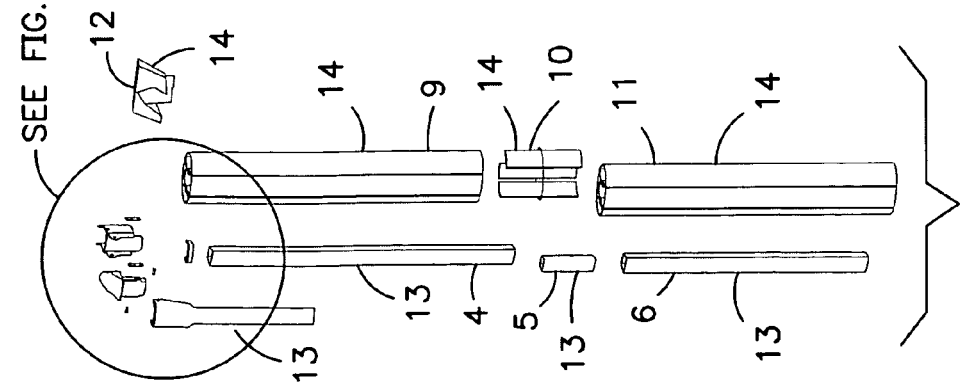
FIG. 3 shows an exploded view of FIG. 2.
Figure 7:
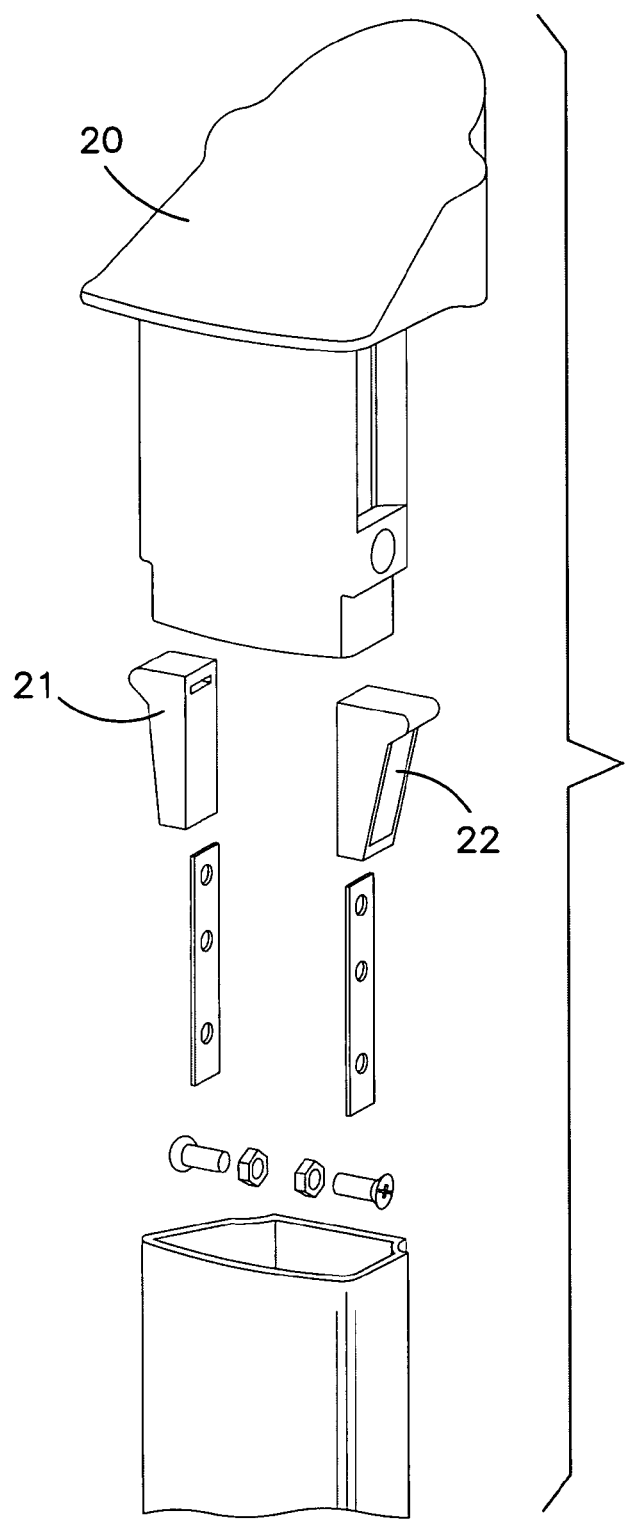
FIG. 7 shows an exploded view of an alternative embodiment of the rod cap shown in FIGS. 3, 4 and 5.

The height rod assembly 13 includes an upper height rod 4, a lower height rod 6, and a connecting bracket 5. At the upper end of the upper height rod is a collar 16 (see FIG. 3) which mounts a lever assembly 15 that include a lever bracket 2, a cap 3 and a lever 1. The lever is mounted on the bracket 2 via locking pins 7, and spacers 8 are attached to the sides of the lever bracket 2. As seen in FIG. 4, the cap 3 includes self-locking release tabs 3A on opposite sides thereof.

When assembling the lever assembly 15, the lever 1 is attached to the lever bracket 2 with the two locking pins 7. No tools are required. The spacers 8 are attached to the lever bracket 2.

When assembling the height rod assembly 13, the lower height rod 6 is attached to the bottom half of the connecting bracket 5 and the upper height rod 4 is attached to the top half of the connecting bracket 5. The cap 3 is attached to the upper height rod 4 and permanently secured with glue. The lever assembly 15 is attached to the cap 3 with the two self-locking tabs 3A. The self-locking tabs 3A engage the lever bracket 2.

When assembling the column assembly 14, the lower scale column 11 is attached to the bottom half of the connecting bracket 10 and the upper scale column 9 is attached to the top half of the connecting bracket 10. The indicator support 12 is attached to the upper scale column 9 and is permanently secured with glue.

In use, the height rod assembly 13 is slid inside the channel 9A of upper scale column 9, making sure the two spacers (8) are aligned on each side of the lever bracket (2) with the two channels 9B. The height rod assembly 13 is pushed down until the cap 3 bottoms out on the upper scale column 9. By pushing the height rod assembly 13 all the way down, it will cause the two locking tabs 3A in the cap 3 to be disengaged from the lever bracket 2. This will enable height measurements from 44 inches down to 24 inches. To take measurements between 44 inches and 84 inches, the height rod assembly 13 is pushed upwardly until the lever assembly 15 is engaged with the lever bracket 2 by means of the two locking tabs 3A. This will allow measurements of 44 inches to 84 inches.

The engagement and disengagement of the lever bracket 2 to the height rod cap 3 is automatically accomplished without having to manually disengage these two components. The locking tabs 3A disengage themselves when they touch the inside wall of the upper scale column 9.

In other height rod devices, a user has to manually push the locking tabs to disengage the lever bracket from the height rod cap.

Figure 1:
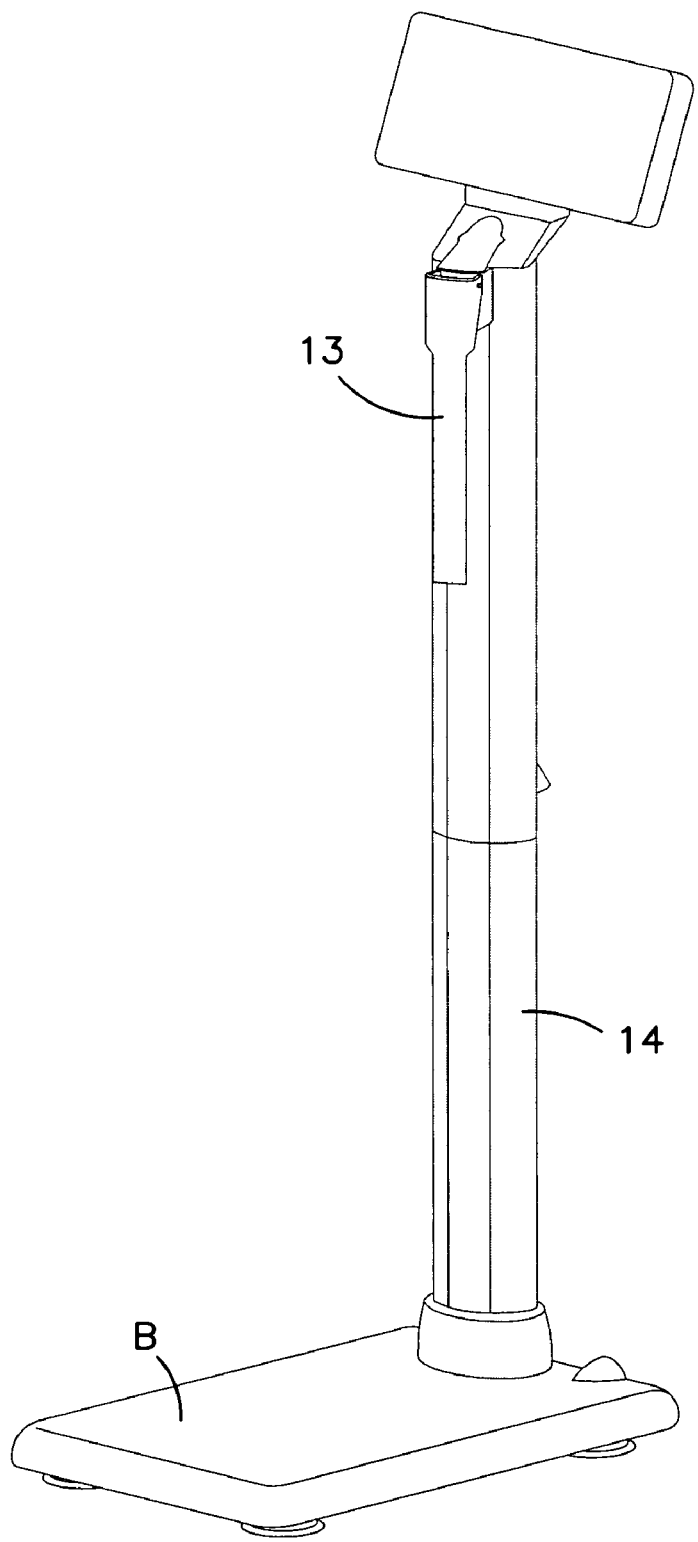
FIG. 1 shows a perspective view of a complete height scale according to a preferred embodiment of this invention.
Figure 2:
FIG. 2 shows a similar view of the column and rod assemblies thereof.
Figure 6:
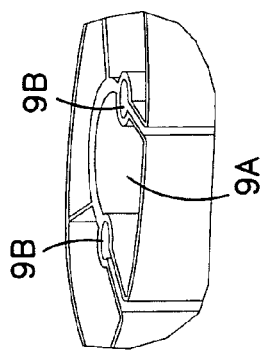
FIG. 6 shows an enlarged view of detail C in FIG. 3.
Figure 5:
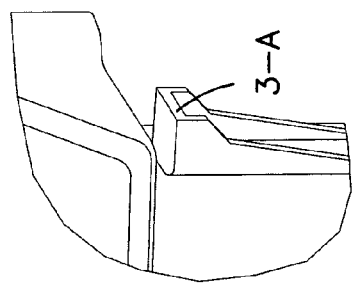
FIG. 5 shows an enlarged view of detail B in FIG. 3.

As seen in FIG. 6, the rod cap can be made of multiple components connected together (instead of a one-piece construction), including a cap element 20 to which are connected two release tabs 21, 22.

We claim:

1. A height scale which comprises a base, a column assembly mounted on the base and comprising a scale column having a longitudinal center channel therein and respective longitudinal slots on opposite sides of said center channel, and a height rod assembly that can slide along said center channel in said scale column, and which includes a lever assembly at an upper end thereof, said lever assembly including a rod cap which has self-locking release tabs on opposite sides thereof.

2. The height scale of claim 1, wherein said column comprises an upper scale column, a lower scale column, and a column bracket connected therebetween.

3. The height scale of claim 1, wherein said height rod assembly includes an upper height rod, a lower height rod, and a rod bracket connected therebetween.

4. The height scale of claim 3, wherein said lever assembly includes a lever bracket and a lever attached to said lever bracket.

5. The height scale of claim 1, wherein said rod cap is one piece.

6. The height scale of claim 1, wherein said rod cap comprises a cap element and said release tabs are attached to said cap element.

* * * * *